No. 670,730. Patented Mar. 26, 1901.
L. PROCHÁZKA.
APPARATUS FOR MASHING AND BREWING.
(Application filed Apr. 2, 1900.)
(No Model.) 3 Sheets—Sheet 1.

No. 670,730. Patented Mar. 26, 1901.
L. PROCHÁZKA.
APPARATUS FOR MASHING AND BREWING.
(Application filed Apr. 2, 1900.)
(No Model.) 3 Sheets—Sheet 2.
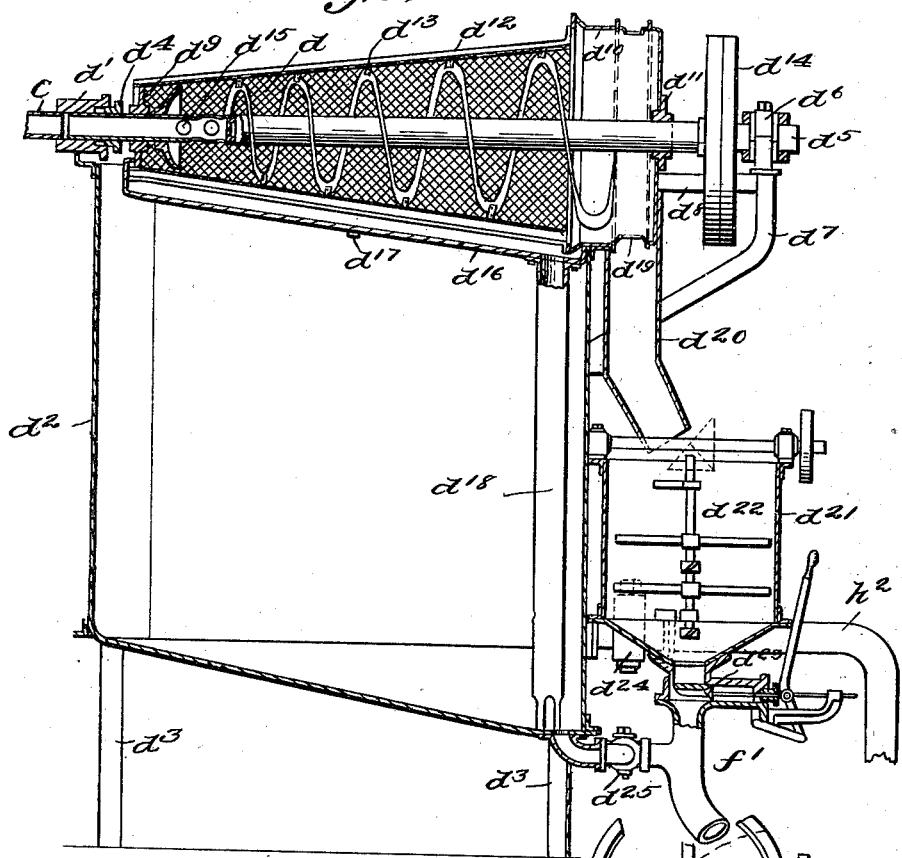
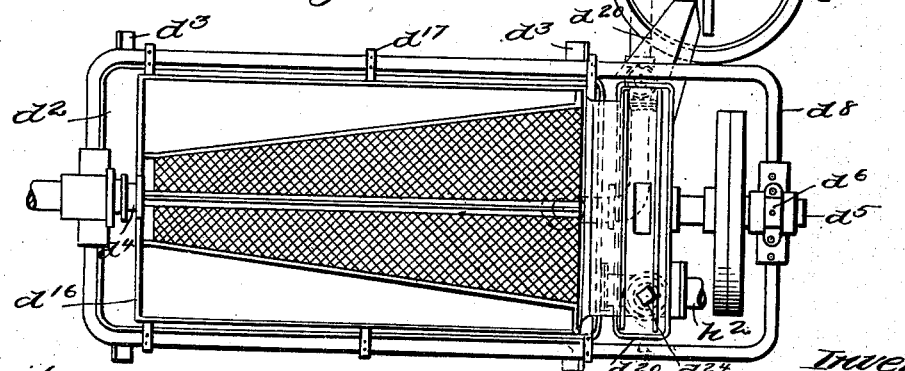
Witnesses:
Inventor
Ladislav Procházka
By James L. Norris
Atty No. 670,730. Patented Mar. 26, 1901.
L. PROCHÁZKA.
APPARATUS FOR MASHING AND BREWING.
(Application filed Apr. 2, 1900.)
(No Model.) 3 Sheets—Sheet 3.

Witnesses: Inventor
Ladislav Procházka
By James L. Norris
Atty

Title: UNITED STATES PATENT OFFICE.

LADISLAV PROCHÁZKA, OF TURNAU, AUSTRIA-HUNGARY.

APPARATUS FOR MASHING AND BREWING.

SPECIFICATION forming part of Letters Patent No. 670,730, dated March 26, 1901.

Original application filed May 21, 1897, Serial No. 637,617. Divided and this application filed April 2, 1900. Serial No. 11,220. (No model.)

*To all whom it may concern:*

Be it known that I, LADISLAV PROCHÁZKA, a subject of the Emperor of Austria-Hungary, residing at Turnau, Province of Bohemia, and Empire of Austria-Hungary, have invented certain new and useful Improvements in Apparatus for Mashing and Brewing, of which the following is a specification.

This invention relates to improvements in apparatus for mashing and brewing and is a division of my application for United States Letters Patent filed May 21, 1897, Serial No. 637,617; and the object of the invention is to provide an apparatus specially designed to effect the operations of mashing and brewing in such a manner that a greater yield shall be obtained than has heretofore been considered possible, and the resulting beer shall not be liable to become muddy or cloudy.

In order that the invention may be clearly understood, I will proceed to describe the same by aid of the accompanying drawings, in which—

Figure 1:
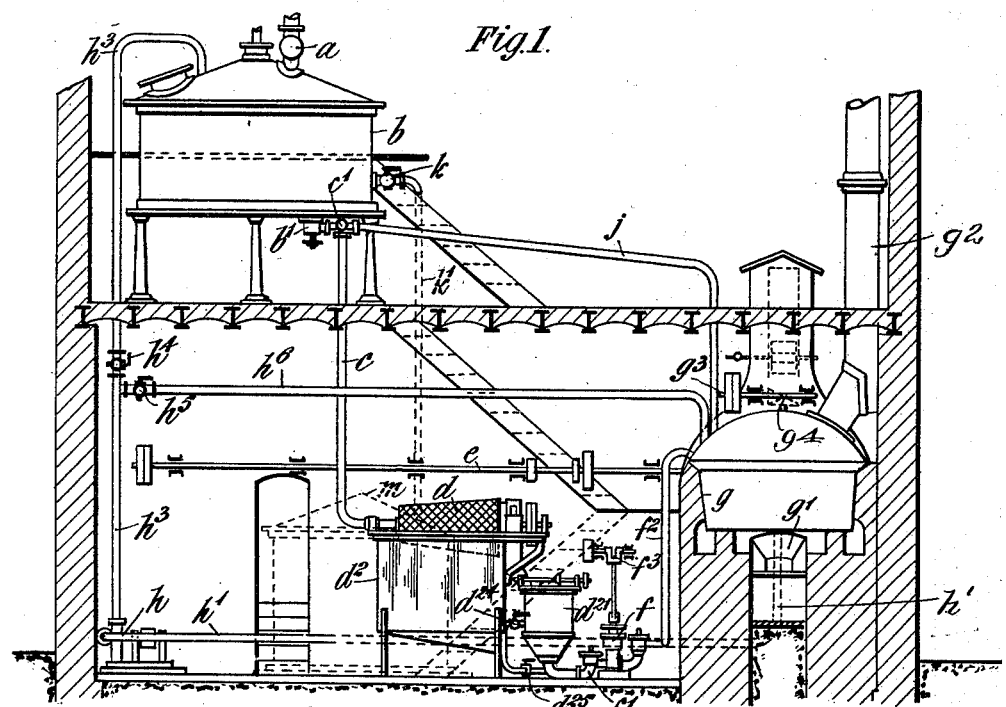
Figure 2:
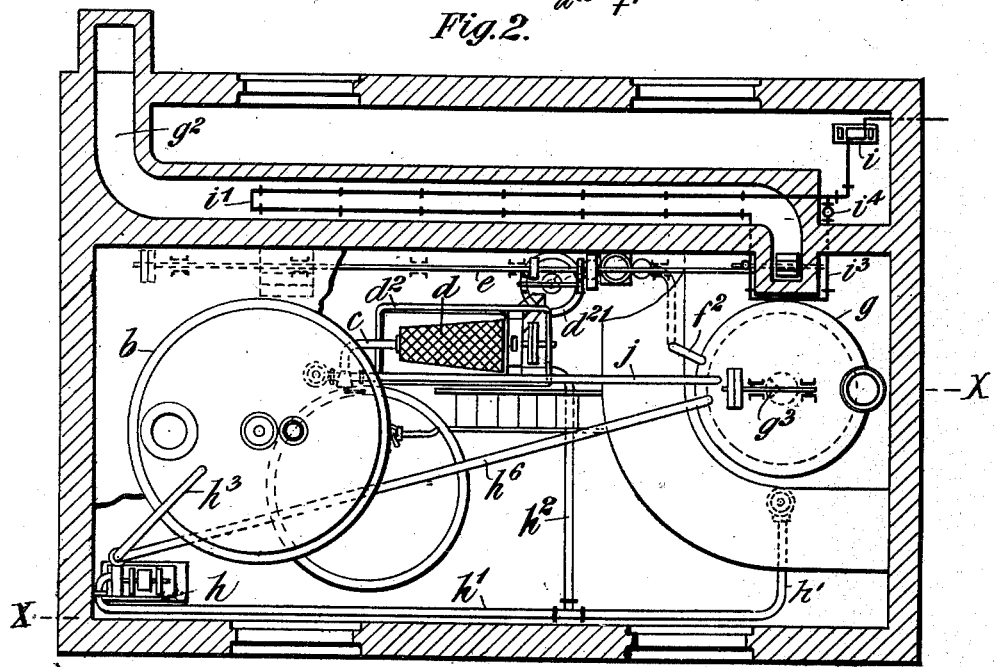
Figure 5:
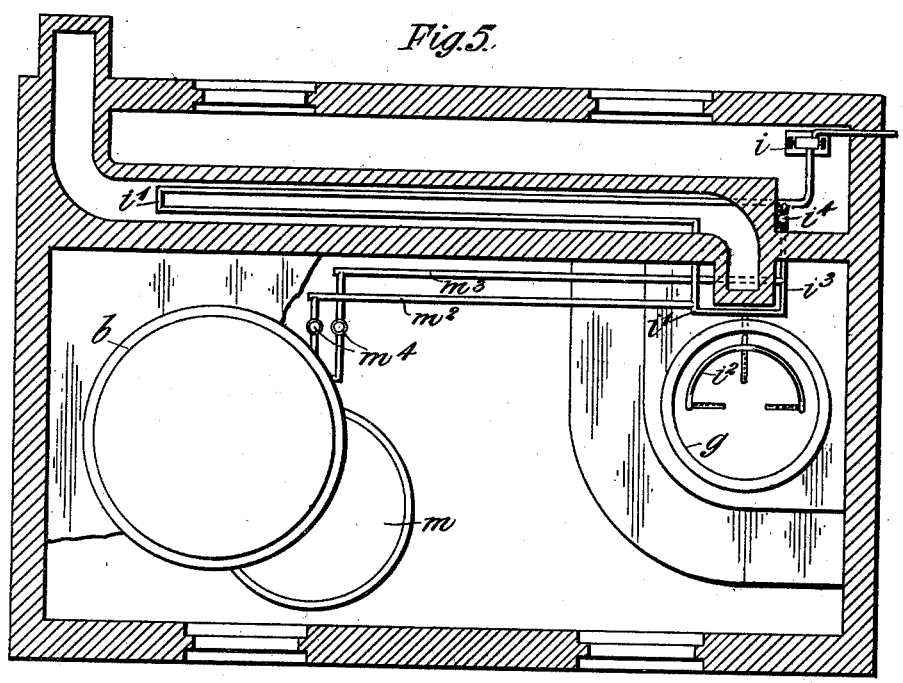
Figure 6:
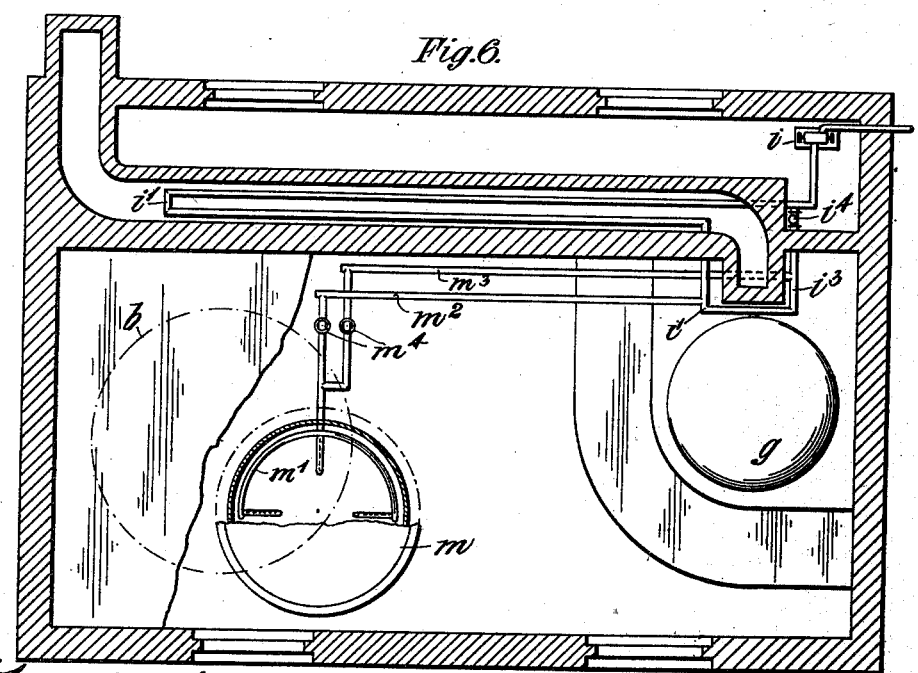

Figure 1 is a section of a brewing plant on the line X X, Fig. 2, showing the apparatus itself in elevation. Fig. 2 is a sectional plan of Fig. 1. Fig. 3 is a vertical central section, partly in elevation, of a rotary strainer hereinafter referred to. Fig. 4 is a plan of the said strainer. Fig. 5 is an enlarged detailed plan view showing more particularly the boiling-pan and hot and cold air pipes. Fig. 6 is a similar view disclosing more especially the hop-back hot-air-injecting pipes.

$a$ is a filling-pipe for the mash-tun, $b$ is the said tun, $c$ is a draw-off pipe from said tun, $d$ is a rotary strainer to which said pipe leads, and $e$ is a shaft for driving said strainer. This rotary strainer $d$, which is shown more clearly in Figs. 3 and 4, is, as stated, connected, through the pipe $e$, with the mash-tun. The lower end of this pipe $c$ is tightly inserted into an annular bearing $d'$, secured to the flanged edge of a sheet-metal casing or tank $d^2$, which is supported by angle-iron legs $d^3$ and is strengthened by angle-irons. The inner end of the said bearing $d'$ is fitted with a stuffing-box $d^4$ upon a shaft $d^5$, on which the conical wire drum forming the strainer $d$ is mounted. The one end of the shaft $d^5$ is supported in the bearing $d'$. The opposite end of the shaft $d^5$ rests in an ordinary bearing $d^6$, supported by brackets $d^7$, riveted to the side of the casing, and by the wide flange $d^8$ on the said casing. The narrow end of the drum $d$ is closed by a disk or nave $d^9$, secured to the shaft $d^5$, while its wider end is connected with a sheet-metal cylinder $d^{10}$, fastened to the shaft by means of its nave $d^{11}$. Stiffening-ribs $d^{12}$ extend along the sides of the drum and have secured to them by means of wires the metal strip or helix $d^{13}$. By means of the belt-pulley $d^{14}$, driven from the main shaft $e$, a slow rotary movement of about twenty revolutions per minute is imparted to the drum.

$d^{15}$ represents holes in the shaft $d^5$, and $d^{16}$ is an inclined gutter carried by braces $d^{17}$.

$d^{18}$ is a pipe leading into the tank $d^2$.

$d^{19}$ represents slots or openings for admitting filtered solid matters into a delivery-chute $d^{20}$, whence they pass to a vat $d^{21}$, having an agitator $d^{22}$ and a slide-valve $d^{23}$.

$f$ is a pump having its suction-pipe $f'$ connected to the valve-case of the slide-valve $d^{23}$, by which the vat $d^{21}$ is under ordinary circumstances closed at its conical bottom. $f^2$ is the delivery-pipe of the said pump, and $f^3$ is a crank driven from the main shaft $e$, by which the pump is operated.

$g$ is a boiling-pan, $g'$ is the furnace thereof, $g^2$ is the furnace-flue, and $g^3$ is a shaft for working an agitator in said boiling-pan.

$h$ is a second pump, also driven by the shaft $e$ and connected through pipes $h'$ $h^2$ and a cock $d^{24}$ with the strainer-casing $d^2$. Its delivery-pipe $h^3$ extends upward and opens into the mash-tun $b$. When this pump is put into action to pump the extract into the tun, the cock $h^4$ of the pipe $h^3$ is opened and the cock $h^5$ of the branch pipe $h^6$, leading to the boiling-pan $g$, is closed. When, however, the pump is used to force the contents of the boiling-pan into the mash-tun, these cocks are operated accordingly. The height at which the cock $d^{24}$ is placed above the inclined bottom of the tank $d^2$ enables the drawing off the wort in the latter without disturbing the sediment. (See Fig. 3.)

$i$ is a blowing-engine which delivers air into a series of heaters, which may be ribbed or gilled pipes $i'$, located within the flue $g^2$, and the air thus heated flows out through the fine perforations of a branch pipe $i^2$, extending into the pan $g$. Through the pipe $i^3$, branched off directly from the blower $i$ and also opening into the perforated pipe $i^2$, so much cold air is admitted as is required to obtain the temperature of 125° centigrade, the cock $i^4$ controlling the flow of cold air.

$m$ is a hop-back which receives the wort through a cock $k$ and pipe $k'$. (Shown in dotted lines, Fig. 1.)

$j$ is a draw-off pipe connecting the boiling-pan and the tun $b$ and controlled by the cock $c'$. In the hop-back is a branched pipe $m'$ for injection of hot air, which is led to it through a pipe $m^2$, connected with the pipe $i'$. Through a pipe $m^3$, connected with the cold-air pipe $i^3$, cold air is mixed with the hot air to regulate its temperature.

$m^4$ represents cocks for regulating the mixing and the flow of the hot and cold air.

The process which this apparatus is designed to carry out is as follows: After a preliminary mashing operation the wort or extract is separated from the solid matters and the latter are subjected to special treatment to thoroughly liberate all the residual starch and convert the albuminous matters into a permanently-soluble form by the action of hot air. After this the treated matters and the original extract are brought together, so that the diastase in the latter may convert the newly-liberated starch, whereupon the whole is heated to kill the diastase, and hot air is again forced through it to finely oxidize any remaining albuminous matters. The wort is thus brought into a very favorable condition for the subsequent operations and is freed from any matters which might set up clouding in the beer produced.

The action of the apparatus is as follows: Malt and water are admitted through the pipe $a$ to the tun $b$ in the proportion, say, of one hundred kilograms of malt to four or 4.5 hectoliters of water, and the mashing operation continued about an hour, the same being maintained at a temperature of from 50° to 70° centigrade. The mixture is then conducted by pipe $c$ to the strainer $d$, Fig. 3, and then the coarse matter passes through the chute $d^{20}$ to the vat $d^{21}$ and from said vat through the pipe $f'$ via the pump $f$ to the pan $g$. The strained liquid passes into the tank $d^2$, and after settling therein is led to the tun $b$ through the cock $d^{24}$, pipes $h^2$ and $h'$, pump $h$, and pipe $h^3$, connecting the tun and tank. Sediment collecting at the bottom of the tank $d^2$ is pumped through the pipe $f'$ via the cock $d^{25}$ into the pan $g$ along with solid matter from the vat $d^{21}$. In the pan $g$ the solid matter is boiled with water and at the same time treated with injected hot air from the blowing-engine $i$, whereupon a certain portion thereof goes into solution. Said solution is led to tun $b$, (by pipe $h'$, pump $h$, and pipe $h^3$,) where the starch contained therein is converted into sugar by virtue of the diastase contained in the liquid or liquor previously introduced into tun $b$ from the tank $d^2$, as above stated. When conversion is effected in the tun $b$, the liquor is led therefrom to pan $g$ by pipe $j$, where it is properly boiled. After boiling it is led back to the tun $b$ by pipe $h'$ by the action of the pump $h$, and thence by pipe $k'$ to the hop-back $m$, where it passes through a body of hops, and is also simultaneously acted upon by hot air injected through the pipe $m'$, after which it is conducted away for storage,

What I claim, and desire to secure by Letters Patent, is—

1. The apparatus of the character described, comprising a mash-tun, a rotary strainer, a casing beneath said strainer to receive the filtrate and allow it to deposit sediment, a boiling-pan, means for blowing hot air through the contents of said boiling-pan, pumps for transporting the extract and residues from one to the other of these parts, and means for altering the connections of said pumps accordingly, substantially as described.

2. In apparatus of the character described, the combination of a mash-tun, a rotary strainer, a boiling-pan, a hot-air pipe in the flue of said boiling-pan, an air-pump for forcing air through said pipe into said boiling-pan, a branch pipe for leading cold air direct from said air-pump to the hot air from the hot-air pipe, and a cock in such branch pipe for controlling the flow of cold air and so regulating the temperature of the air blown into the boiling-pan, substantially as described.

3. In apparatus of the character described, the combination of a conical wire strainer, a rotary shaft passing through said strainer, means for admitting wort through one end of said shaft, a revolving helix carried by said strainer and serving to eject the solid residues therefrom, a vat to receive said residues, means for diluting and agitating said residues in said vat, a tank with inclined bottom to receive the filtrate and allow it to deposit sediment, and means for uniting said diluted residues and sediment, substantially as described.

4. In apparatus of the character described, the combination of a conical strainer, a rotary hollow shaft carrying said strainer and perforated at its contracted end, a metal helix inside of said strainer, a metal cylinder arranged at the enlarged end of said strainer, a tank arranged beneath said strainer and having an inclined bottom for collecting sediment, a stirring-vat for receiving the solid residues from the conical strainer, slide-valve for discharging such residues from said vat, a cock for withdrawing the sediment from the inclined bottom of said tank, a pipe in which said sediment is mixed with the solid matters from the stirring-vat, and means for withdrawing the strained and settled extract from the tank without disturbing the sediment, substantially as described.

In testimony whereof I have hereunto set my hand this 19th day of March, 1900.

LADISLAV PROCHÁZKA.

Witnesses:
CHAS. B. BURDON,
WALTER J. SKERTEN.